US012711908B2

(12) United States Patent
Chen

(10) Patent No.: US 12,711,908 B2
(45) Date of Patent: Aug. 18, 2026

(54) ELECTRONIC DEVICE

(71) Applicant: SENSORTEK TECHNOLOGY CORP., Hsinchu County (TW)

(72) Inventor: Rong-Fong Chen, Hsinchu County (TW)

(73) Assignee: SENSORTEK TECHNOLOGY CORP., Hsinchu County (TW)

( * ) Notice: Subject to any disclaimer, the term of this patent is extended or adjusted under 35 U.S.C. 154(b) by 0 days.

(21) Appl. No.: 19/046,561

(22) Filed: Feb. 6, 2025

(65) Prior Publication Data

US 2025/0252908 A1 Aug. 7, 2025

Related U.S. Application Data

(60) Provisional application No. 63/550,063, filed on Feb. 6, 2024.

(51) Int. Cl.
*G09G 3/32* (2016.01)

(52) U.S. Cl.
CPC ....... *G09G 3/32* (2013.01); *G09G 2320/0242* (2013.01); *G09G 2340/0435* (2013.01)

(58) Field of Classification Search
CPC ............. G09G 3/32; G09G 2340/0435; G09G 2320/0242
See application file for complete search history.

(56) References Cited

U.S. PATENT DOCUMENTS

2007/0279407 A1* 12/2007 Vasquez ................. G09G 5/006 345/213
2008/0091990 A1* 4/2008 Bruce .................. G11C 29/021 714/721
2023/0196995 A1* 6/2023 Li ........................ G09G 3/3208 345/204
2023/0252936 A1* 8/2023 Lin ......................... G06F 3/147 345/214

FOREIGN PATENT DOCUMENTS

CN 105590575 A 5/2016
TW 201331907 A 8/2013
TW 202338781 A 10/2023

OTHER PUBLICATIONS

Taiwan Patent Office "Office Action" issued on Mar. 4, 2026, Taiwan Patent Office.

* cited by examiner

*Primary Examiner* — Muhammad N Edun
(74) *Attorney, Agent, or Firm* — WPAT, PC

(57) ABSTRACT

The present application provides an electronic device, which includes a display unit, a display driving circuit, and an electronic component. The display driving circuit is coupled to the display unit, and the display driving circuit is capable of driving the display unit to display images with a plurality of refresh rate modes including a first refresh rate and a second refresh rate. The electronic component is disposed under a display area of the display unit, is coupled to the display driving circuit, and receives a dynamic refresh signal
(Continued)

generated by the display driving circuit, wherein the dynamic refresh signal includes a plurality of initial pulses and a plurality of delay pulses. Thus, the present application overcomes the problem that mutual interference between display pixels and under-screen electronic component cannot be effectively avoided in existing technology when the display unit changes screen refresh rates.

16 Claims, 5 Drawing Sheets

ELECTRONIC DEVICE

FIELD OF THE INVENTION

The present application related to an electronic device, particularly to an electronic device with electronic components disposed under a screen.

BACKGROUND OF THE INVENTION

For current consumer electronics products, such as smartphones and tablets, manufacturers aim to maximize screen size by relocating electronic components originally disposed on the screen border to under the display area, thus reducing the space occupied on the border and further minimizing the border size. Consequently, within a fixed physical size, the electronic products may have larger screens, achieving a better screen-to-body ratio. Currently, the electronic components, that may be moved under the screen, include cameras, fingerprint sensors, and various light sensors.

However, the display pixels of the screen and the electronic components disposed under the screen may interfere with each other. For example, a camera under the screen might receive light emitted by display pixels, causing image distortion; conversely, when the electronic components with light emitters (such as distance sensors, time-of-flight ranging, dot projectors) are disposed under the screen, the emitted invisible light may still affect screen imaging, potentially causing bright spots. Various manufacturers have proposed different technical solutions to overcome the interference between display pixels and under-screen electronic components, such as controlling the under-screen electronic components to be inactive when the display pixels are light, and controlling the display pixels to be unlight when the under-screen electronic components are active.

With the advancement of display technology towards higher screen resolutions and refresh rates, as well as enhanced system computation and communication capabilities, the power consumption of the electronic devices increases. Under limited battery capacity, some manufacturers propose dynamically adjusting the screen refresh rate to reduce overall power consumption. For example, the refresh rate may be controlled to be over 120 Hz during gaming, 60 Hz in movie mode, and from 1 Hz to 30 Hz for static images.

Variations in the refresh rate of the screen make it difficult for the electronic devices to accurately determine when the display pixels corresponding to the under-screen electronic components should illuminate, rendering many existing technology solutions for preventing interference between display pixels and under-screen electronic components failing. Consequently, an existing improvement involves an additional pin used for providing the refresh rate information of the display panel to the electronic components under the screen, but this existing improvement significantly increases the overall system cost.

On the other hand, the applicant previously filed U.S. Patent Application, issued patent No. U.S. Pat. No. 11,935,462, which reveals a method of integrating the refresh rate information of the display panel into a dynamic refresh signal generated by the display driver circuit. The dynamic refresh signal is then decoded by the electronic components under the screen, the operations of the electronic components are controlled by this refresh rate information. The applicant now provides further improvements to this technology.

SUMMARY OF THE INVENTION

An objective of the present application is to provide an electronic device, which allows that the under-screen electronic component receive a dynamic refresh signal generated by a display driver circuit. This dynamic refresh signal includes a plurality of initial pulses and a plurality of delayed pulses, enabling the electronic component to operate in coordination with the display driver circuit when controlled by this dynamic refresh signal, effectively preventing interference between the display pixels and the under-screen electronic component and overcoming the issue of existing technology solutions for preventing the interference failing while changing the refresh rate of the screen.

The present application provides an electronic device, comprising a display unit, a display driver circuit, and an electronic component. The display driver circuit is coupled to the display unit and is capable of driving the display unit using a plurality of refresh rate modes, including a first refresh rate and a second refresh rate. The electronic component is disposed under a display area of the display unit, coupled to the display driver circuit, and receives a dynamic refresh signal generated by the display driver circuit. The dynamic refresh signal includes a plurality of initial pulses and a plurality of delayed pulses. Each of the initial pulses of the dynamic refresh signal represents a time point to refresh the display unit controlled by the display driver circuit; the delayed pulses of the dynamic refresh signal include a first delayed pulse corresponding to the first refresh rate and a second delayed pulse corresponding to the second refresh rate.

DETAILED DESCRIPTION OF THE INVENTION

In order to provide the esteemed reviewers with a further understanding and recognition of the features and effects achieved by the present application, it is explained as follows with the aid of embodiments and accompanying descriptions:

In the specifications and subsequent claims, certain words are used for representing specific devices. A person having ordinary skill in the art should know that hardware manufacturers might use different nouns to call the same device. In the specifications and subsequent claims, the differences in names are not used for distinguishing devices. Instead, the differences in functions are the guidelines for distinguishing. In the whole specifications and subsequent claims, the word "comprising" is an open language and should be explained as "comprising but not limited to". Besides, the word "coupled" includes any direct and indirect electrical connection. Thereby, if the description is that a first device is coupled to a second device, it means that the first device is connected electrically to the second device directly, or the first device is connected electrically to the second device via other device or connecting means indirectly.

Figure 1:
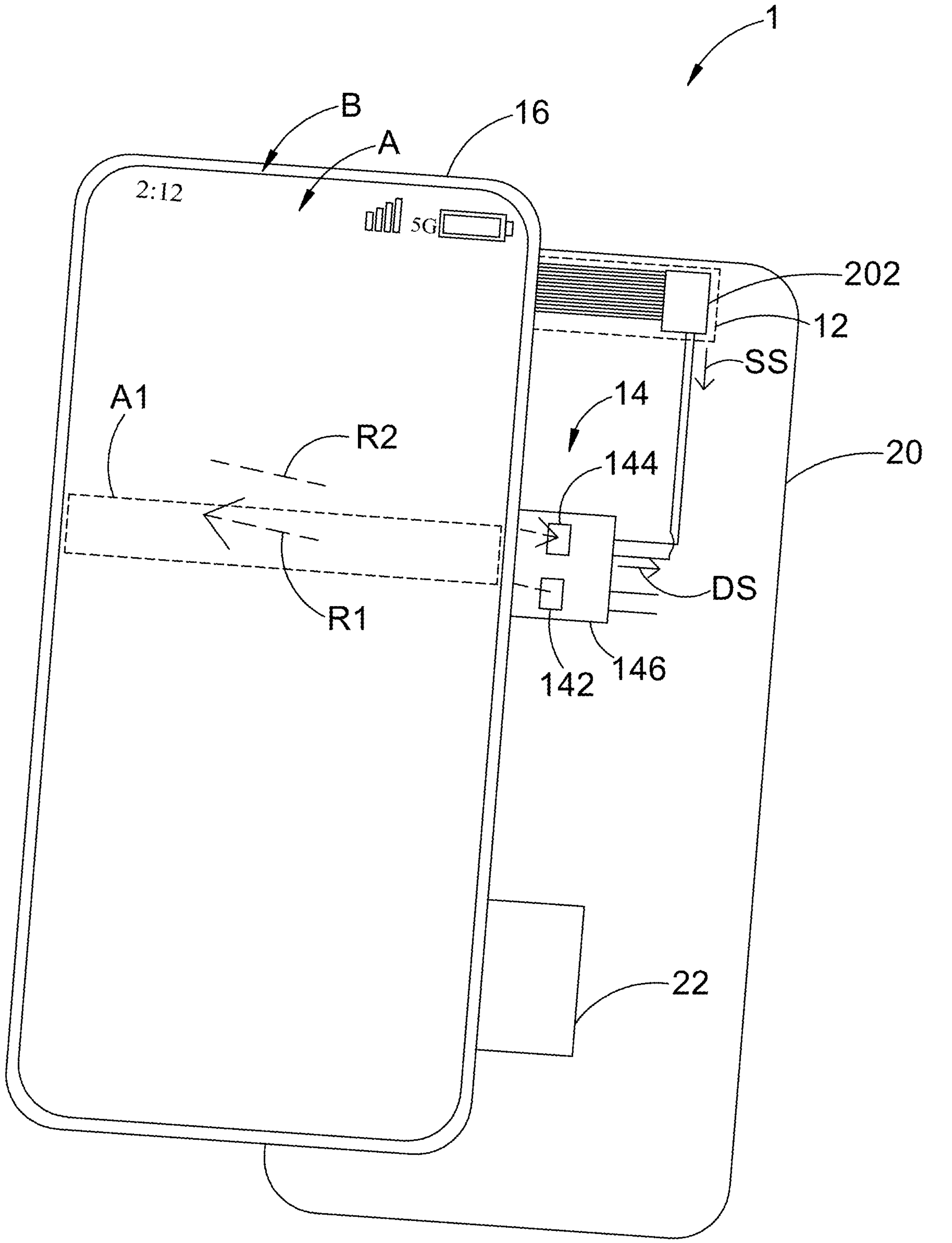
FIG. 1 shows a structural schematic diagram of an electronic device according to an embodiment of the present application.

Hereinafter, the electronic device disclosed by the present application and the characteristics and structures of its electronic component will be further described through various embodiments:

First, please refer to FIG. 1, which is a schematic diagram of an embodiment of the electronic device of the present application. As shown in the figure, the electronic device 1 according to the present application comprises a display driving circuit 12, an electronic component 14, and a display unit 16, in this embodiment, the electronic component 14 comprises a light-emitting unit 142, a sensing unit 144, and a control circuit 146, wherein the control circuit 146 is coupled to the light-emitting unit 142 and the sensing unit 144 respectively, and the display unit 16 may include a display panel, such as a Liquid-Crystal Display (LCD) or an Organic Light Emitting Diode (OLED) display, and the display unit 16 is generally also integrated with a touch circuit for touch functionality. The light-emitting unit 142 and the sensing unit 144 included in the electronic component 14 are disposed under a display area A of the display unit 16, thus, the electronic component 14 in this embodiment is arranged to be an under-screen design. In this embodiment, the light-emitting unit 142 and the sensing unit 144 may be integrated with the control circuit 146 in a single integrated circuit chip, however, the present application is not limited to this and may also dispose the light-emitting unit 142 and the sensing unit 144 at different locations under a display area A and couple them to the control circuit 146. The display area A refers to the area of the display unit 16 that has effective display pixels for displaying images and is not obscured by the frame area B of the electronic device.

The electronic component 14 includes a light-emitting unit 142, a sensing unit 144, and a control circuit 146 exemplified in this embodiment, the electronic component 14 may be used to construct various sensing devices such as a distance sensor, a time-of-flight ranging sensor, and a dot projector. However, the reason of exemplifying the electronic component 14 for illustration is because the included light-emitting unit 142 may affect screen imaging, making it crucial to avoid interference between the display pixels of the display unit 16 and the light-emitting unit 142. Compared to electronic component, such as cameras, fingerprint sensors, and light sensors, which are usually only affected by screen illumination, using the electronic component 14 makes it easier to fully explain the technical effects brought by the improvements of the present application.

Continued to the above, in this embodiment, the electronic component 14 is further coupled to a display drive circuit 12, which is connected to the display unit 16. Specifically, the display drive circuit 12 may be coupled to the control circuit 146 of the electronic component 14 via a transmission unit 202, which may be wiring lines or other electrical connection structures. The transmission unit 202 may be mounted on a substrate 20 along with the electronic component 14, wherein the substrate 20 may be a main board of electronic products, such as mobile phones, but the present application is not limited to this. Generally, the display drive circuit 12 comprises one or more independent integrated circuit chips, include duties of controlling the driving timing, driving voltage, and display data access of the display unit 16, thus, the display unit 16 is correctly driven to display images.

The display drive circuit 12 generates a dynamic refresh signal SS, which includes information about the refresh rate of the display unit 16, and in this embodiment, the display drive circuit 12 outputs the Dynamic Refresh Signal SS to the control circuit 146 of the electronic component 14. It is noteworthy that in actual commercial products, the display drive circuit 12 and the electronic component 14 are often designed and manufactured by different companies; therefore, if the present application is to achieve higher market acceptance, it is essential to individually reduce the design complexity of both the display drive circuit 12 and the electronic component 14.

Figure 2:
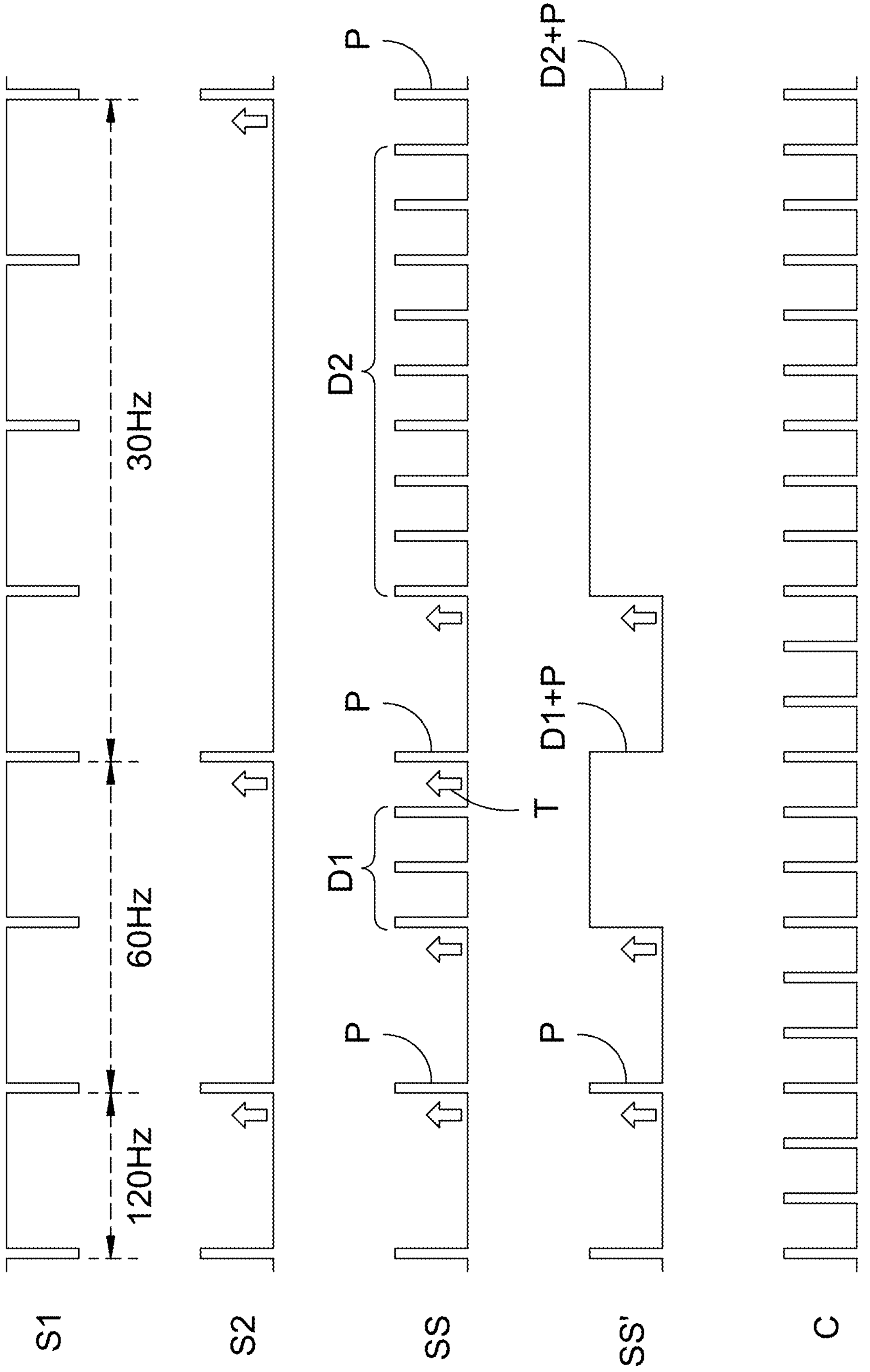
FIG. 2 shows a schematic diagram of a dynamic refresh signal in the electronic device according to a preferred embodiment of the present application.

For this purpose, for the display driver circuit 12, this embodiment adopts a technical solution which makes it easy to integrate the refresh rate of the display unit 16 into the dynamic refresh signal SS. Specifically, please refer to a schematic diagram of a dynamic refresh signal as shown in FIG. 2. Wherein S1 is a synchronization signal for display data (hereinafter referred to as the data synchronization signal), such as a vertical synchronization signal. Assuming that in the environment of display driver circuit 12, the display data is applied for refreshing a frame at a fixed frequency of 120 Hz, then the frequency of the data synchronization signal S1 may be fixed at 120 Hz. However, for the display driver circuit 12 providing the function of dynamically adjusting the refresh rate of the display unit 16, the synchronization signal S2 (hereinafter referred to as the display synchronization signal) used for display control by display driver circuit 12 is not fixed at 120 Hz, for example, includes three modes, such as 120 Hz, 60 Hz, and 30 Hz, as shown in the figure. The display synchronization signal S2 may be a tearing effect (TE) signal, a scan line synchronization signal, or other synchronization signals used for display control. It is noted that the three modes of 120 Hz, 60 Hz, and 30 Hz are just examples for illustration purposes in the present application, and are not limited thereto.

The dynamic refresh signal SS includes a plurality of initial pulses P and a plurality of delay pulses D1, D2, wherein each of the initial pulses P represents a time point to start refreshing the display unit 16 controlled by the display driver circuit 12, which may be synchronized with the display synchronization signal S2. On the other hand, the delay pulses D1, D2 are inserted at the time points to pause refreshing of the display unit 16 controlled by the display driver circuit 12 for reducing the refresh rate. When the display synchronization signal S2 is at 120 Hz, the dynamic refresh signal SS may not insert any delay pulse; when the display synchronization signal S2 is at 60 Hz, the dynamic refresh signal SS may be inserted with a shorter first delay pulse D1 in the latter half; when the display synchronization signal S2 is at 30 Hz, the dynamic refresh signal SS may be inserted with a longer second delay pulse D2 in the latter ¾.

Through the above preferred embodiment of the present application, it is possible to achieve the technical effect of individually reducing the design complexity of both the display driver circuit 12 and the electronic component 14, detailed as follows:

For the display driver circuit 12, signals such as the data synchronization signal S1, display synchronization signal S2, and the refresh rate information of the display unit 16 are already existing signals. Therefore, it is easy to determine a time point to pause refreshing of the display unit 16 controlled by the display driver circuit 12 for reducing the refresh rate, and thus generate the dynamic refresh signal SS inserted by the delay pulses D1, D2, without a special signal processing procedure. In this case, the delay pulses D1, D2 do not require additional circuits for generation. For example, there is usually a high-frequency (e.g., 360 Hz) clock signal C present in the system, thus, the display driver circuit 12 may directly use segments of the existing clock signal C as the delay pulses D1, D2. In other words, the display driver circuit 12 may form the dynamic refresh signal SS required by the preferred embodiment of the present application through a simple design.

On the other hand, for the electronic component 14, after receiving the dynamic refresh signal SS, the electronic component 14 is not necessary to decode the dynamic refresh signal SS to control the operation of other components in coordination with the display driver circuit 12. Specifically, as shown in FIG. 1 and FIG. 2, since the electronic component 14 is disposed at fixed locations within electronic device 1, when the light-emitting unit 142 is disposed under the display unit 16, the emitted sensing light R1 only affects one or a plurality of rows of display pixels in a localized display area of display unit 16. Therefore, by controlling the operation of the light-emitting unit 142 at specific periods, it is possible to avoid the illumination times of the display pixels in the localized display area A1, thereby preventing interference with display unit 16 that could cause bright spots or flickering. For example, if it is necessary to control the activation of the light-emitting unit 142 in localized display area A1 after it is enabled, at a refresh rate of 120 Hz, it is only necessary to calculate the preset duration based on the position of the initial pulse P in the dynamic refresh signal SS and repeatedly activate light-emitting unit 142 at the same 120 Hz frequency to control its operation at the appropriate period.

When the refresh rate of display unit 16 is dynamically adjusted, for example, to 60 Hz, if no action is taken, the light-emitting unit 142 will activate twice during a single display refresh, potentially affecting the screen imaging. However, when the refresh rate is adjusted to 60 Hz, a shorter first delay pulse D1 is inserted by the dynamic refresh signal SS, which may be used to prevent the light-emitting unit 142 from activating at the originally scheduled time T (as shown at a dashed box in FIG. 2, which shows that the activation of light-emitting unit 142 is halted), thus, ensuring that the electronic component 14 controlled by the dynamic refresh signal SS does not activate twice during a single display refresh. Similarly, if the refresh rate of the display unit 16 is adjusted to 30 Hz and no action is taken, the light-emitting unit 142 would activate four times during a single display refresh; however, a longer second delay pulse D2 is inserted by the dynamic refresh signal SS at this time, ensuring that the electronic component 14 controlled by the dynamic refresh signal SS does not activate four times during a single display refresh.

It should be noted that when electronic component 14 is controlled by the dynamic refresh signal SS, there is no need to decode the dynamic refresh signal SS to confirm the current refresh rate of display unit 16. This allows operation of the light-emitting unit 142 in coordination with control of the display driver circuit 12, significantly simplifying the design complexity of electronic component 14 and substantially reducing control latency, making the present application particularly suitable for products requiring to continuously change the refresh rates of the screen.

Figure 3:
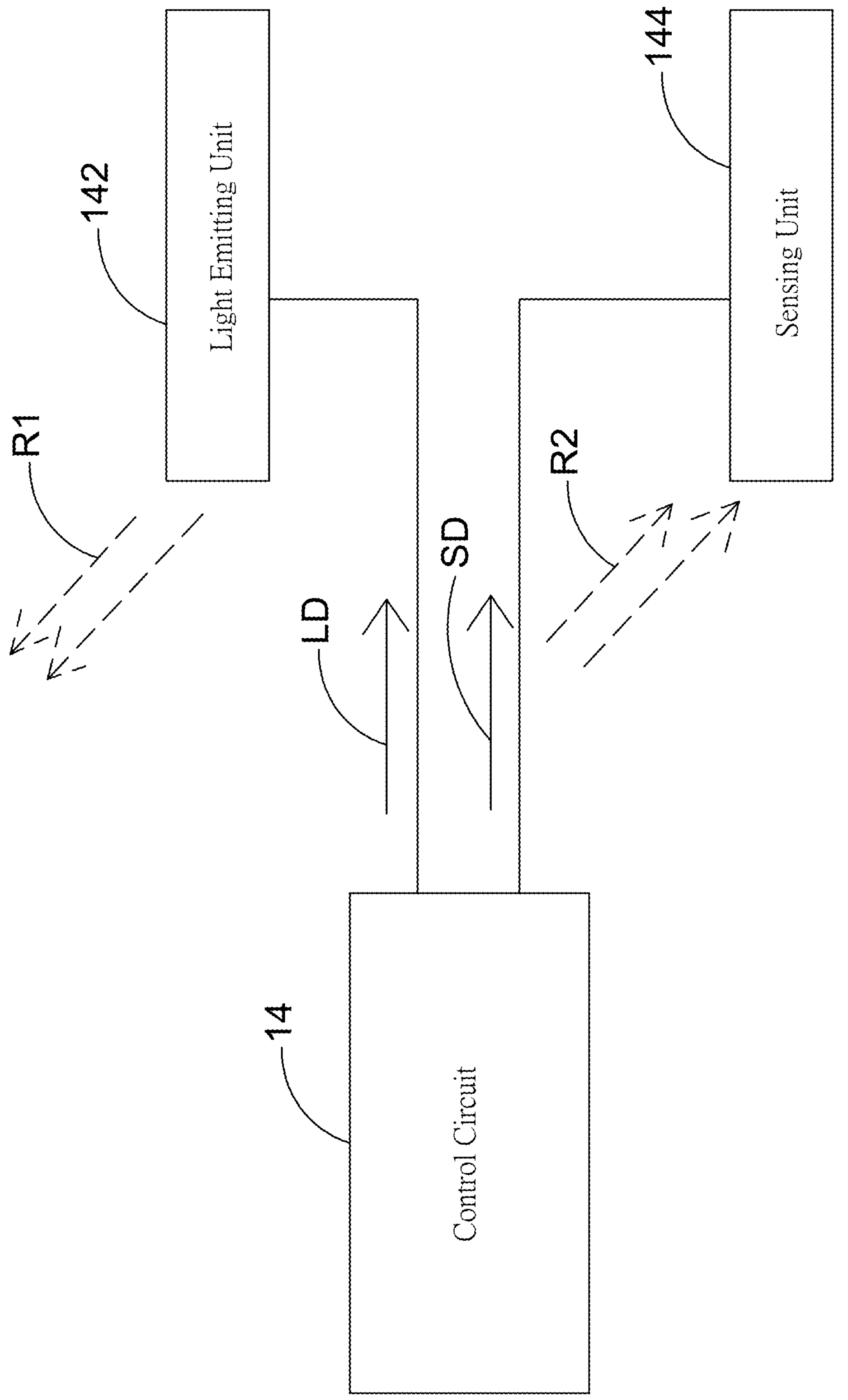
FIG. 3 shows a circuit schematic diagram of an electronic component in the electronic device according to an embodiment of the present application.

As described above, in this embodiment, the electronic component 14 includes a light-emitting unit 142, which enables it to be used in various sensing devices, such as distance sensors, time-of-flight ranging sensors, and dot projectors. To illustrate, we will first explain how the electronic component 14 operates as a distance sensor when receiving the dynamic refresh signal SS. As shown in FIG. 3, the electronic component 14 may include a light drive signal LD and a sensing drive signal SD. The control circuit 146 receives the dynamic refresh signal SS and controls the light-emitting unit 142 based on the dynamic refresh signal SS. At the time point when the light-emitting unit 142 needs to operate, the control circuit 146 generates the light drive signal LD and transmits it to the light-emitting unit 142 for driving the light-emitting unit 142 to emit a sensing light R1. Simultaneously, in this embodiment, the control circuit 146 further generates the sensing drive signal SD and transmits it to the sensing unit 144 for driving the sensing unit 144 to detect a reflected light R2 of the sensing light R1. Additionally, in some embodiments of the present application, the sensing unit 144 continuously senses light without stopping, thus the control circuit 146 may solely use the light drive signal LD to drive the light-emitting unit 142. The light-emitting unit 142 may be a light-emitting diode (LED) or a laser diode (LD), and the sensing light R1 primarily is applied in general distance sensing operations by using infrared or other invisible light.

Furthermore, as shown in FIG. 1, the electronic component 14 transmits a sensing signal DS produced by the sensing unit 144 to a processing unit 22 on the substrate 20. The processing unit 22 may determine whether the display unit 16 is proximity to an object or a human body based on the sensing signal DS provided by the sensing unit 144, and thus determine whether to disable the touch and display functions of the display unit 16.

Through the above-described embodiments, the present application allows the electronic component 14 to cooperate with the display drive circuit 12, ensuring that regardless of the current refresh rate of the display unit 16, the electronic component 14 may control the light-emitting unit 142 to operate a preset number of times during a single display refresh. This helps prevent the sensing light R1 of the light-emitting unit 142 from interfering with the normal colors displaying on the display pixels, ensuring that it does not easily cause bright spots or flickering formed on the display unit 16.

The following describes various modifications of the preferred embodiments of the present application:

Referring to FIG. 2, the person skilled in the art, based on the teachings of the present application, may attempt to merge the aforementioned delay pulses D1, D2 with the subsequent starting pulse P into a single pulse, thereby forming another form of the dynamic refresh signal SS, which could further simplify the design of both the driving circuit 12 and the electronic component 14. However, the single pulse is essentially composed of the delay pulses D1, D2, inserted by the display driving circuit 12 to reduce the refresh rate and control the display unit 16 pausing refreshing, followed by the starting pulse P, thus still falling within the scope of protection sought by the present application.

Figure 4:
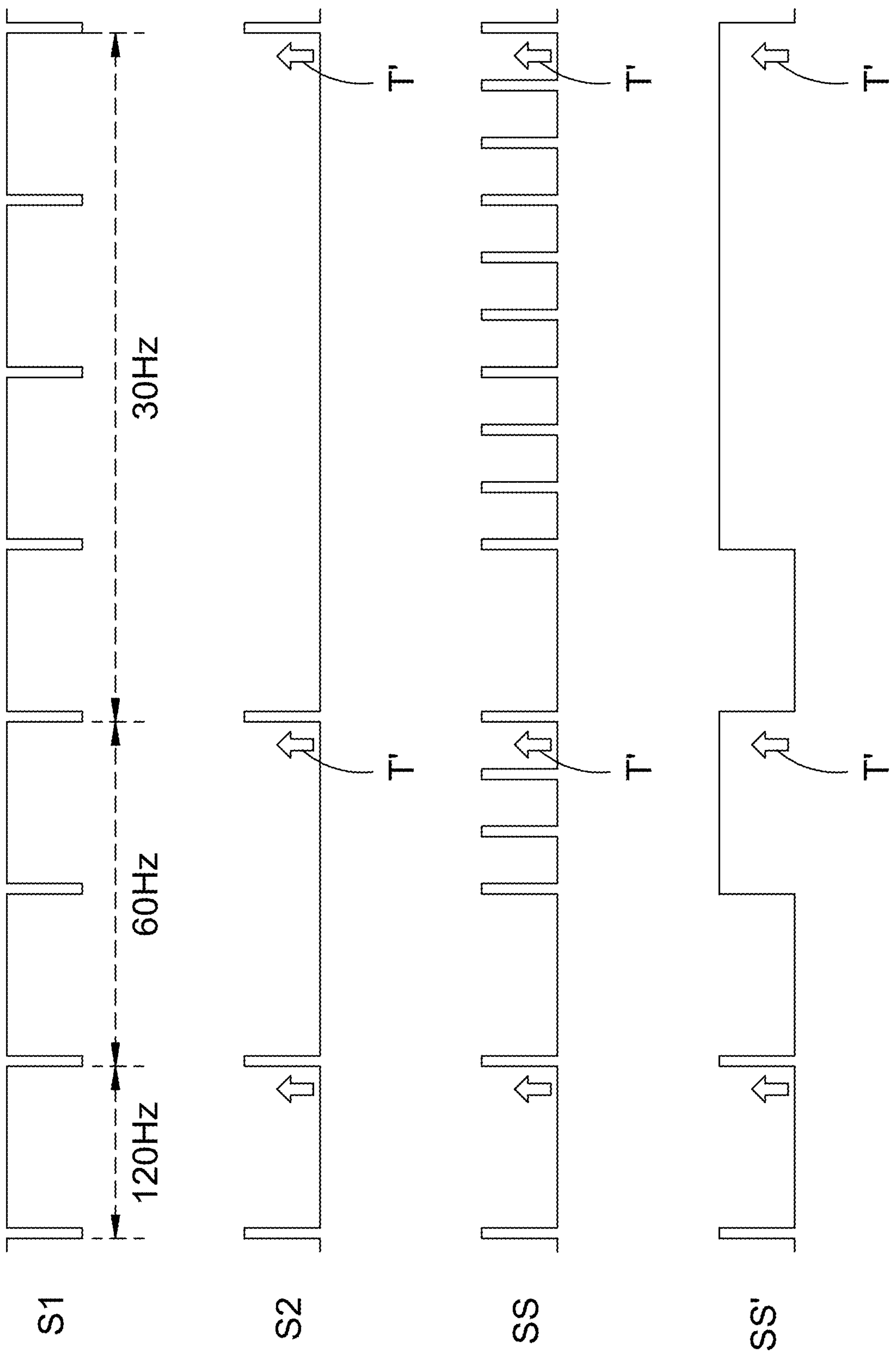
FIG. 4 shows a variation schematic diagram of the dynamic refresh signal in the electronic device according to an embodiment of the present application.

Although in the aforementioned embodiment, the electronic component 14, when controlled by the dynamic refresh signal SS, does not need to decode the dynamic refresh signal SS to confirm the current refresh rate of the display unit 16, it may control the operation of the light-emitting unit 142 in coordination with the display driving circuit 12. However, as shown in FIG. 4, the person skilled in the art is willing to incur the circuit costs of decoding the dynamic refresh signal SS and endure the disadvantages of delayed control may still refer to the technical content disclosed in the applicant's prior US Patent No. U.S. Pat. No. 11,935,462, by decoding the dynamic refresh signal SS (e.g., determining that the absence of inserted delay pulses corresponds to 120 Hz; determining that the insertion of the shorter first delay pulse D1 corresponds to 60 Hz; or determining that the insertion of the longer second delay pulse D2 corresponds to 30 Hz) to confirm the current refresh rate of the display unit 16, and thus, based on the real-time refresh rate information, operate a specific period from the time point of the starting pulse P in the dynamic refresh signal SS to determine the most suitable timing T' for controlling the operation of the light-emitting unit 142 under various modes such as under mode of 120 Hz, under mode of 60 Hz, and under mode of 30 Hz. Although the applicant has also marked the same timing T' in the display synchronization signal S2, the person skilled in the art would know that to control the operation of the light-emitting unit 142 at those timings T' based on the display synchronization signal S2, it is essential to obtain the refresh rate information of the display panel and perform the corresponding signal processing to achieve this.

It is noteworthy that even in the variation, as shown in FIG. 4, the display driving circuit 12 still possesses the advantage of generating the dynamic refresh signal SS with inserted delay pulses D1, D2 without requiring a special signal processing procedure, allowing the display driving circuit 12 to generate the dynamic refresh signal SS needed for the aforementioned variation implementation through a simple design.

Figure 5:
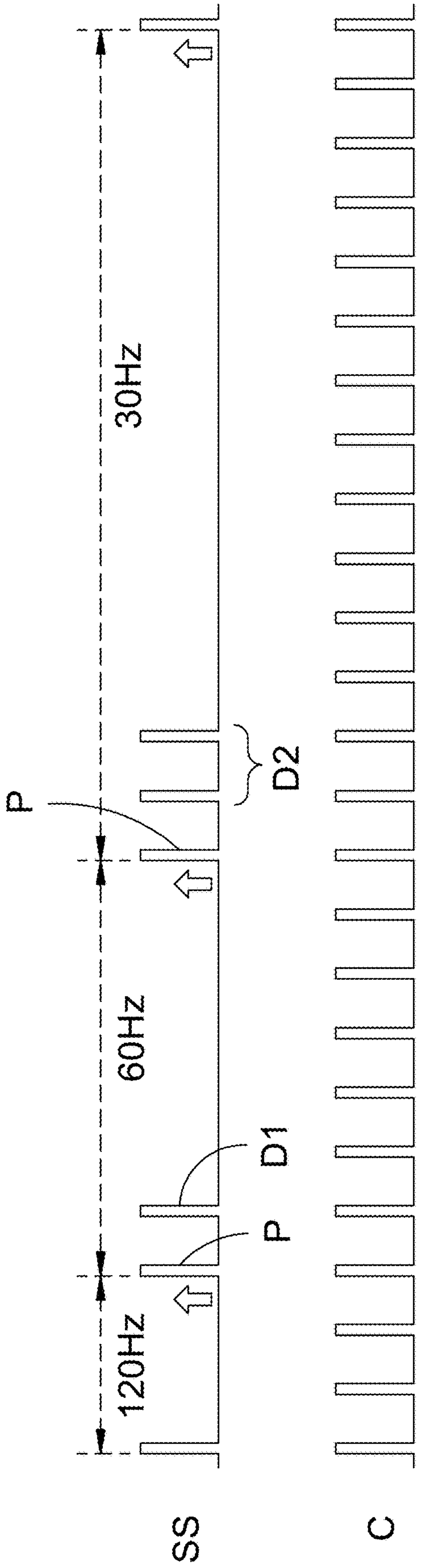
FIG. 5 shows a variation schematic diagram of the dynamic refresh signal in the electronic device according to another embodiment of the present application.

Furthermore, although in the aforementioned examples and variation implementations, the delay pulses D1, D2 are inserted at the time point to pause refreshing the display unit 16 controlled by the display driving circuit 12 for reducing the refresh rate, the person skilled in the art might, based on the teachings of the present application, also attempt other simple variations to generate different forms of the dynamic refresh signal SS, aiming to achieve the same or similar technical effects. For example, as shown in FIG. 5, the person skilled in the art may attempt inserting the delay pulses D1, D2 at the position adjacent to the starting pulse P. Although this method might require the display driving circuit 12 to undergo an additional signal processing procedure, thereby incurring costs, the dynamic refresh signal SS formed by inserting different delay pulses D1, D2 at the position adjacent to the starting pulse P may still timely control the electronic component 14, ensuring that regardless of whether the update rate of the dynamic refresh signal SS is adjusted to 60 Hz or 30 Hz, it effectively prevents the light-emitting unit 142 from operating at incorrect periods, ensuring that the light-emitting unit 142 only operates the predetermined number of times during a single display refresh. Furthermore, in slower processing circuit systems, the aforementioned variation may provide more ample time for the electronic component 14 to effectively prevent the light-emitting unit 142 from operating at incorrect periods.

Wherein, the differences in the delay pulses D1, D2 may refer to differences in the number of pulses (for example, as shown in FIG. 5, the delay pulses D1, D2 each have 1 and 2 pulses respectively) or differences in pulse duration, but the present application is not limited to thereto.

As above mentioned, in other embodiments of the present application, the electronic component 14 may also include cameras (image sensors), fingerprint sensors, and various other application components. Even if the electronic component 14 does not have a light-emitting unit 142, the dynamic refresh signal SS may be still used to determine the current refresh rate of the display unit 16, thereby, synchronizing or avoiding the light emission timing of the display pixels of display unit 16.

To highlight the outstanding effects brought by various embodiments of the present application, illustrating an example of dynamically adjusting the refresh rate in a commercially available product. In products with touting for adaptive features, to avoid noticeable flickering during the refresh rate adjustment process, a gradual adaptive adjustment is generally made between the initial and target refresh rates. For example, if it is necessary to reduce the refresh rate of the display unit 16 from 120 Hz to 1 Hz, the adjustment might sequentially proceed in a very short time from 120 Hz, 90 Hz, 60 Hz, 30 Hz, to 1 Hz. In such cases, if the preferred embodiment of the present application is used, allowing the display driver circuit 12 to output the dynamic refresh signal SS to the electronic component 14, and if the electronic component 14 does not decode the dynamic refresh signal SS to confirm the current refresh rate of the display unit 16, but uses it directly to control the operation of the electronic component 14 (e.g., light-emitting unit 142) in coordination with display driver circuit 12, this may significantly reduce control delays. Thus, during the rapid changes in the refresh rate, the electronic component 14 may immediately synchronize with the current refresh rate of the screen, ensuring it operates at the appropriate period.

In summary, the present application provides an electronic device, which allows an under-screen electronic component to receive a dynamic refresh signal generated by a display driver circuit. The dynamic refresh signal includes a plurality of initial pulses and a plurality of delayed pulses, enabling the electronic component to operate in coordination with the display driver circuit, effectively preventing interference between the display pixels and the under-screen electronic component. Especially when the under-screen electronic component includes a light-emitting unit, this approach prevents the emitted light from interfering with the normal display of colors on the pixels, thus avoiding bright spots or flickering on the display panel.

Furthermore, the display driving circuit of the present application may generate the required dynamic refresh signal through a simple design, which simplifies the design complexity of electronic component and even reduces the control delay of the circuit, effectively preventing interference between display pixels and under-screen electronic component.

Therefore, the present application, being novel, progressive, and industrially applicable, undoubtedly meets the requirements for a patent application under our national patent law. Accordingly, the present application is filed in accordance with the law, earnestly praying for the patent grant at the earliest convenience.

However, the above descriptions are merely preferred embodiments of the present application and are not intended to limit the scope of the present application. Any equivalent modifications and variations in shape, structure, features, and spirit as described in the claims of the present application should be included within the scope of the present application.

The invention claimed is:

1. An electronic device, comprising:

a display unit;

a display driving circuit, coupled to the display unit, configured for driving the display unit in a plurality of refresh rate modes, the refresh rate modes including a first refresh rate and a second refresh rate;

an electronic component, disposed under a display area of the display unit, coupled to the display driving circuit, and receiving a dynamic refresh signal generated by the display driving circuit, the dynamic refresh signal including a plurality of initial pulses and a plurality of delayed pulses;

wherein the initial pulses of the dynamic refresh signal are corresponding to refreshing of the display unit controlled by the display driving circuit; the delayed pulses of the dynamic refresh signal include a first delayed pulse corresponding to the first refresh rate and a second delayed pulse corresponding to the second refresh rate.

2. The electronic device of claim 1, wherein when the display driving circuit controls the refreshing of the display unit at the first refresh rate, the first delayed pulse is inserted between two adjacent initial pulses and corresponding to pausing the refreshing of the display unit controlled by the display driving circuit; when the display driving circuit controls the refreshing of the display unit at the second refresh rate, the second delayed pulse is inserted between two adjacent initial pulses and corresponding to pausing the refreshing of the display unit controlled by the display driving circuit.

3. The electronic device of claim 2, wherein the refresh rate modes include a third refresh rate, which is higher than the first and second refresh rates, and when the display driving circuit controls the refreshing of the display unit at this third refresh rate, no delay pulse is inserted between two adjacent initiating pulses.

4. The electronic device of claim 3, wherein when the display driving circuit controls the refreshing of the display unit at the third refresh rate, the dynamic refresh signal controls the electronic component to operate repeatedly at the frequency of the third refresh rate.

5. The electronic device of claim 4, wherein, when the display driving circuit controls the refreshing of the display unit at the first refresh rate, the first delay pulse is used to prevent the electronic component from operating at a time point; when the display driving circuit controls the refreshing of the display unit at the second refresh rate, the first delay pulse is used to prevent the electronic component from operating at a plurality of time points.

6. The electronic device of claim 1, wherein the dynamic refresh signal includes a refresh rate information of the display unit, and when the electronic component is controlled by the dynamic refresh signal, the electronic component does not decode the dynamic refresh signal to obtain the refresh rate information.

7. The electronic device of claim 2, wherein the first and second delay pulses are formed by segments of a clock signal generated from the display driving circuit, and the frequency of the clock signal is higher than both the first and second refresh rates.

8. The electronic device of claim 2, wherein the first delay pulse merges with an adjacent initiating pulse to form a single pulse; the second delay pulse merges with another adjacent initiating pulse to form another single pulse.

9. The electronic device of claim 1, wherein the dynamic refresh signal includes a refresh rate information of the display unit, and when the electronic component is controlled by the dynamic refresh signal, the electronic component decodes the dynamic refresh signal to obtain the refresh rate information.

10. The electronic device of claim 1, wherein, when the display driving circuit controls the refreshing of the display unit at the first refresh rate, the first delay pulse is inserted at a position adjacent to an initiating pulse; when the display driving circuit controls the refreshing of the display unit at the second refresh rate, the second delay pulse is inserted at a position adjacent to another initiating pulse.

11. The electronic device of claim 10, wherein the first delay pulse and the second delay pulse are formed by segments of a clock signal generated from the display drive circuit, and the frequency of the clock signal is higher than both the first and second refresh rates.

12. The electronic device of claim 11, wherein the number of clock signal pulses contained in the first delay pulse is different from the number of clock signal pulses contained in the second delay pulse.

13. The electronic device of claim 1, wherein the electronic component includes a light-emitting unit, and the electronic component controls the operation of the light-emitting unit based on the dynamic refresh signal.

14. The electronic device of claim 13, wherein the light-emitting unit is either a light-emitting diode or a laser diode.

15. The electronic device of claim 13, wherein the electronic component further includes a sensing unit, and the control circuit generates a light drive signal to the light-emitting unit and a sensing drive signal to the sensing unit based on the dynamic refresh signal, the light-emitting unit generates a light source in response to the light drive signal, and the sensing unit receives a reflected light corresponding to the light source in response to the sensing drive signal, generating a sensing signal correspondingly.

16. The electronic device of claim 13, wherein the electronic component operates based on the dynamic refresh signal to prevent the light emitted by the light-emitting unit from interfering with the normal colors displaying on the display unit.

* * * * *